July 30, 1935.  K. RÄNTSCH ET AL  2,009,816
OPTICAL REVERSING SYSTEM
Filed Sept. 23, 1932
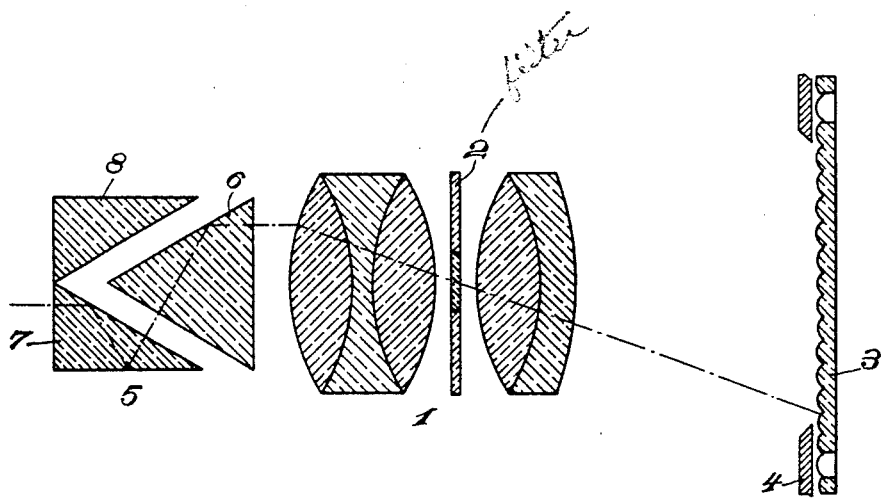
INVENTORS
Kurt Räntsch and Waldemar Ewald
BY *Gifford, Scull & Burgess*
ATTORNEYS Patented July 30, 1935

2,009,816

UNITED STATES PATENT OFFICE 2,009,816

OPTICAL REVERSING SYSTEM

Kurt Räntsch, Teltow-Seehof, near Berlin, and Waldemar Ewald, Berlin-Lichterfelde-Ost, Germany, assignors to Siemens & Halske, Aktiengesellschaft, Siemensstadt, near Berlin, Germany, a corporation of Germany Application September 23, 1932, Serial No. 634,527
In Germany September 23, 1931

2 Claims. (Cl. 88—1)

The invention relates to an optical reversing system particularly useful in connection with lenticulated films, a colour filter being arranged within the objective of the camera when the system is used in connection with the taking of pictures.

An advantage of the new device consists in that it is possible to project the copies obtained from the images taken with the new apparatus so that their goffered sides face the projection objective. The copying process can thereby be effected in the usual manner by contact or by projection.

The further advantages resulting therefrom will be more fully explained hereafter.

The invention consists in that, in connection with an objective at the taking apparatus, an optical system is arranged which consists of prisms and interchanges the right side and the left side. The design of this system which is preferably placed in front of the objective may be seen in detail in the figure.

The drawing represents a transverse section through the new device. 1 designates the objective containing the colour filter 2. The film 3 is placed behind the film gate 4. The reversal system 5 is seen before the objective. It consists of three prismatic glass bodies 6, 7 and 8. The prism 6 has an equilateral triangle as base, whereas the bases of the prisms 7 and 8 are triangles having angles of 30°, 60° and 90°, these bases being parallel to the sections appearing in the drawing.

The prisms 7 and 8 must be at such a distance from the prism 6 that the image appears in the middle without any overlapping or deformation. The advantage of the reversal system shown in the figure results from its short length and the large angle, which the cone of light, passing it, may have. By the use of suitable glass species, this angle may be made larger than the angle, by which the prism 6 is seen from the midst of the front surface of the system 5. Use may however also be made of species of glass having the refraction index 1.5 or neighbouring refraction indices, enabling the said two angles to coincide with each other. This permits the insertion of the reversal system at discretion in the light beam, without being obliged to modify the adjustment. The angle by which the aperture of the whole taking system—i. e. objective and reversal system—is seen, must be adapted to the angle by which a lenticular element is seen from the photographic layer. These angles can preferably be equal to each other, more particularly in case of a square aperture of the objective. But it can also be chosen greater or slightly smaller for an adequate filter sub-division.

A special advantage of the new device as compared with what is known is as follows: If images are taken by means of an ordinary taking apparatus and copied in the usual manner, the projection must be effected so that the first, third or fifth copies turn their goffered sides towards the light source so as to prevent the right and left sides of the image to be interchanged. But then it is necessary to arrange the colour filter in the immediate neighbourhood of the light source, such an arrangement having considerable drawbacks on account of the high temperature radiated from the light source. The films taken by means of the new device can, on the contrary, be copied in the usual way and the first copy as also each further copy of odd number can be reproduced by means of a projection apparatus, having a colour filter in its objective.

In order to enable also the first, third and fifth copies to be projected in the manner indicated above by arranging the colour filter at the projection objective, the originals produced with the aid of an ordinary taking device have already been copied optically and a reversal system has been arranged in the light beam between the two films. The use of the new taking camera has, on the contrary, the advantage that copies can be printed by contact, which method, on account of the common transport of both films and on account of the fact that an optical system between the two films can be dispensed with, offers considerable advantages.

We claim:

1. An optical reversing system comprising a prism having a cross-section, as seen in a plane extending parallel to the longitudinal axis of the system, in the form of an equilateral triangle, said triangle having a base thereof disposed perpendicular to said axis and having the apex opposite said base disposed on said axis, and two prisms having faces disposed respectively parallel to the sides of said triangle on opposite sides of said apex, said prisms having cross-sections parallel to that of the first-named prism, in the form of right-angled triangles whose hypotenuses lie in said faces.

2. An optical reversing system comprising a prism having a cross-section, as seen in a plane extending parallel to the longitudinal axis of the system, in the form of an isosceles triangle, said triangle having a base thereon disposed perpendicular to said axis and having the apex opposite said base disposed on said axis, and two prisms having faces disposed respectively parallel to the equal sides of said triangle on opposite sides of said apex, said prisms having cross-sections, parallel to that of the first-named prism, in the form of triangles with bases parallel to the base of said isosceles triangle and disposed in line with each other.

KURT RÄNTSCH.
WALDEMAR EWALD.